US012604007B2

(12) United States Patent
Li et al.

(10) Patent No.: US 12,604,007 B2
(45) Date of Patent: Apr. 14, 2026

(54) SYSTEMS AND METHODS FOR PROCESSING HYPERSPECTRAL IMAGE INFORMATION

(71) Applicant: AtomBeam Technologies Inc., Moraga, CA (US)

(72) Inventors: Zhu Li, Overland Park, KS (US); Paras Maharjan, Kansas City, MO (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 18/665,546

(22) Filed: May 15, 2024

(65) Prior Publication Data

US 2025/0358422 A1    Nov. 20, 2025

(51) Int. Cl.
| | |
|---|---|
| *H04N 19/132* | (2014.01) |
| *H04N 19/136* | (2014.01) |
| *H04N 19/176* | (2014.01) |
| *H04N 19/42* | (2014.01) |
| *H04N 19/625* | (2014.01) |

(52) U.S. Cl.
CPC ......... *H04N 19/132* (2014.11); *H04N 19/136* (2014.11); *H04N 19/176* (2014.11); *H04N 19/42* (2014.11); *H04N 19/625* (2014.11)

(58) Field of Classification Search
CPC .................................................... H04N 19/132
USPC ........................................ 375/240.01–240.29
See application file for complete search history.

(56) References Cited

U.S. PATENT DOCUMENTS

| | | | | |
|---|---|---|---|---|
| 7,224,845 | B1 * | 5/2007 | Russo | H04N 19/14 |
| | | | | 375/E7.072 |
| 11,677,948 | B2 * | 6/2023 | Besenbruch | G06T 9/002 |
| | | | | 375/240.03 |
| 11,948,297 | B1 * | 4/2024 | Cogan | G16H 30/40 |
| 12,001,935 | B2 * | 6/2024 | Sjögren | G06N 3/0455 |
| 2010/0240996 | A1 * | 9/2010 | Lonasec | G06T 7/262 |
| | | | | 600/443 |
| 2011/0191067 | A1 * | 8/2011 | Robles-Kelly | G06T 17/30 |
| | | | | 702/189 |
| 2019/0096049 | A1 * | 3/2019 | Kim | G06T 5/60 |
| 2019/0251707 | A1 * | 8/2019 | Gupta | G06T 9/002 |
| 2019/0297326 | A1 * | 9/2019 | Reda | G06T 5/20 |
| 2020/0145661 | A1 * | 5/2020 | Jeon | G06N 3/08 |
| 2020/0175290 | A1 * | 6/2020 | Raja | G06N 3/045 |

(Continued)

*Primary Examiner* — Leron Beck

(74) *Attorney, Agent, or Firm* — GALVIN PATENT LAW LLC; Brian R. Galvin

(57) ABSTRACT

A system and method are disclosed for processing hyperspectral image information. A set of hyperspectral images is obtained, and a spectrum compact representation is derived for each hyperspectral image in the set of hyperspectral images. The spectrum compact representation for each hyperspectral image in the set of hyperspectral images is encoded with a video encoder, such as an H.266 encoder, to generate an encoded spectrum compact representation for each hyperspectral image in the set of hyperspectral images. The encoded spectrum compact representation is a compressed representation of the original hyperspectral image information that can be transmitted via a communication channel. On a receiving side of the communication channel, the compressed representation can be decompressed utilizing a corresponding video decoder, in conjunction with a joint spatial-frequency (JSF) network.

11 Claims, 9 Drawing Sheets

(56) References Cited

U.S. PATENT DOCUMENTS

| | | | | |
|---|---|---|---|---|
| 2021/0127101 A1* | 4/2021 | Roh | ........................ | H04N 23/55 |
| 2021/0241429 A1* | 8/2021 | Pan | ........................ | G06N 3/045 |
| 2021/0319420 A1* | 10/2021 | Yu | .......................... | G06V 20/52 |
| 2022/0343116 A1* | 10/2022 | Sardeshmukh | ......... | G06F 18/22 |
| 2023/0240641 A1* | 8/2023 | Elhilali | .................. | A61B 7/003 |
| | | | | 600/586 |
| 2023/0281962 A1* | 9/2023 | Wang | .................... | G06T 7/0014 |
| | | | | 382/181 |
| 2023/0334829 A1* | 10/2023 | Du | ........................ | G06V 10/776 |

* cited by examiner

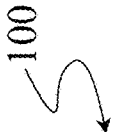
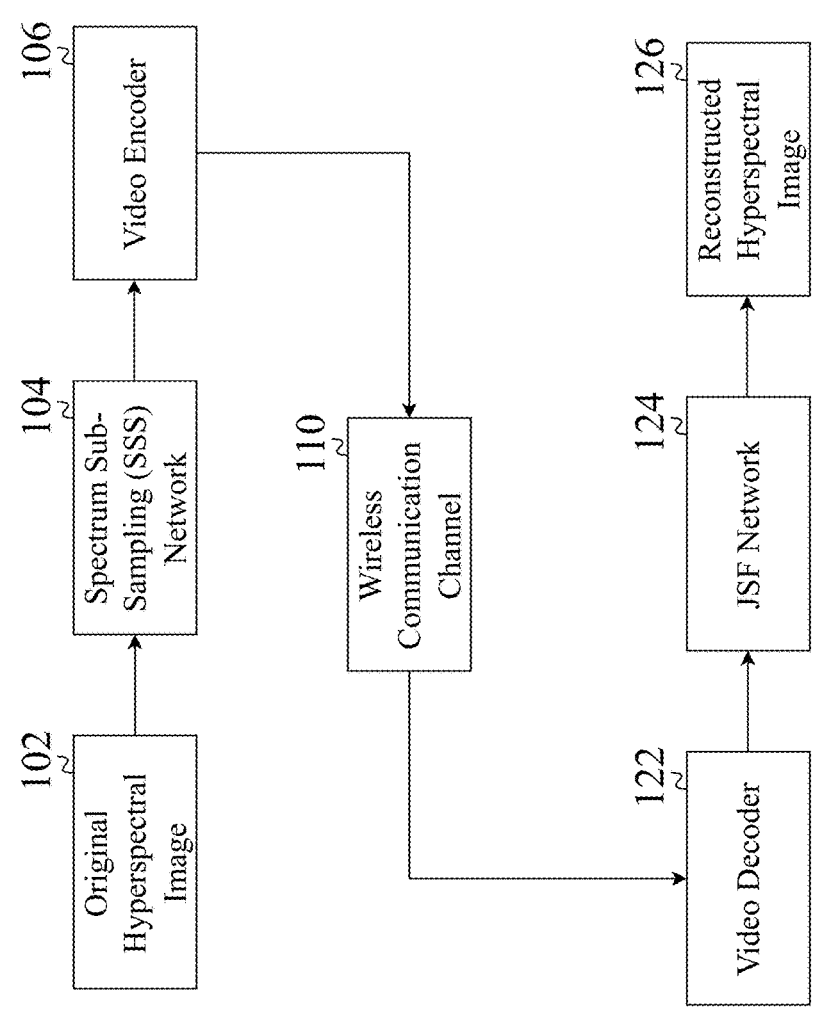
Fig. 1

700

Obtain Training Hyperspectral Image
710

Derive Spectrum Compact Representation
720

Encode Spectrum Compact Representation with Video Encoder
730

Transmit Encoded Spectrum Compact Representation
740

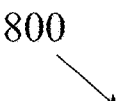

800

```
┌─────────────────────────────────────────────────────────────┐
│        Obtain Encoded Representation of Hyperspectral Image   │
│                              810                              │
└─────────────────────────────────────────────────────────────┘
                              │
                              ▼
┌─────────────────────────────────────────────────────────────┐
│        Decode the Encoded Representation with a Video Decoder │
│                              820                              │
└─────────────────────────────────────────────────────────────┘
                              │
                              ▼
┌─────────────────────────────────────────────────────────────┐
│  Apply Spectrum Compact Representation to Joint Spatial       │
│                Frequency (JSF) Network                        │
│                              830                              │
└─────────────────────────────────────────────────────────────┘
                              │
                              ▼
┌─────────────────────────────────────────────────────────────┐
│     Derive Reconstructed Hyperspectral Image from JSF Network │
│                              840                              │
└─────────────────────────────────────────────────────────────┘
```

Fig. 8

SYSTEMS AND METHODS FOR PROCESSING HYPERSPECTRAL IMAGE INFORMATION

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of image processing, and more particularly is directed to the problem of processing hyperspectral image information.

Discussion of the State of the Art

Hyperspectral imaging is an imaging technique used in various fields such as remote sensing, agriculture, environmental monitoring, forensics, food manufacturing, and medical imaging. Unlike traditional imaging techniques which capture data in three color bands (red, green, and blue), hyperspectral imaging collects and processes information across hundreds or even thousands of narrow contiguous spectral bands. Each pixel in a hyperspectral image contains a spectrum of information across the electromagnetic spectrum, providing detailed spectral signatures for different materials or substances. The spectral information allows for more precise identification and analysis of objects or substances based on their spectral characteristics. Hyperspectral images provide a wealth of information about the composition and properties of the objects or scenes being imaged, making them valuable tools for applications ranging from geological surveys to food quality assessment and disease diagnosis. Overall, hyperspectral imaging can provide detailed information about the composition and properties of the imaged objects or areas, making hyperspectral imaging an important tool for a wide variety of industries and applications.

SUMMARY OF THE INVENTION

Accordingly, there is disclosed herein, systems and methods for processing hyperspectral image information. A set of hyperspectral images is obtained, and a spectrum compact representation is derived for each hyperspectral image in the set of hyperspectral images. The spectrum compact representation for each hyperspectral image in the set of hyperspectral images is encoded with a video encoder, such as an H.266 encoder, to generate an encoded spectrum compact representation for each hyperspectral image in the set of hyperspectral images. The encoded spectrum compact representation is a compressed representation of the original hyperspectral image information that can be transmitted via a communication channel. On a receiving side of the communication channel, the compressed representation can be decompressed utilizing a corresponding video decoder, in conjunction with a joint spatial-frequency (JSF) network.

Hyperspectral images are becoming increasingly important for gathering information for a wide variety of applications. These applications can include environmental monitoring, agriculture, forestry, disaster monitoring, and military reconnaissance, among others. Hyperspectral images (HSI) can be acquired by acquisition equipment installed on aircraft, unmanned aerial vehicles (UAVs), satellites, balloons, and so on. The hyperspectral image information can include multiple spectral channels, and thus, can become quite large. Moreover, aerial vehicles and satellites transmit obtained hyperspectral information via a wireless communication channel. Large amounts of hyperspectral data can be time-consuming to transmit, limiting the amount of hyperspectral data that can be acquired in a timely manner. With the proliferation of UAVs with high resolution hyperspectral sensing capabilities, communication of large size hyperspectral images is becoming a bottleneck to surveillance and monitoring capabilities.

Disclosed embodiments address the aforementioned problems and shortcomings by performing processing of hyperspectral images to enable a data compression scheme that is tailored to hyperspectral images, thereby creating an efficient process for acquiring and transmitting hyperspectral images. Disclosed embodiments utilize spatial and frequency characteristics of hyperspectral images, in order to perform efficient compression and decompression of hyperspectral images that strikes a balance between high compression efficiency and reasonable computational complexity. Disclosed embodiments are well-suited for implementation on various platforms such as multi-core CPU systems, GPU-based computing platforms, FPGA-based computing platforms, and/or custom ASIC-based computing platforms.

According to a preferred embodiment, there is provided a system for hyperspectral image encoding, including: a computing device comprising at least a memory and a processor; a spectral sub-sampling (SSS) module comprising a first plurality of programming instructions stored in the memory and operable on the processor, wherein the first plurality of programming instructions, when operating on the processor, cause the computing device to: obtain a set of hyperspectral images; and derive a spectrum compact representation for each hyperspectral image in the set of hyperspectral images; a video encoding module comprising a second plurality of programming instructions stored in the memory and operable on the processor, wherein the second plurality of programming instructions, when operating on the processor, cause the computing device to: obtain spectrum compact representation for each hyperspectral image in the set of hyperspectral images; and encode the spectrum compact representation for each hyperspectral image in the set of hyperspectral images to generate an encoded spectrum compact representation for each hyperspectral image in the set of hyperspectral images.

According to another preferred embodiment, there is provided a system for hyperspectral image decoding, including: a computing device comprising at least a memory and a processor; a video decoding module comprising a first plurality of programming instructions stored in the memory and operable on the processor, wherein the first plurality of programming instructions, when operating on the processor, cause the computing device to: obtain an encoded representation for each hyperspectral image in a set of hyperspectral images; decode the encoded representation for each hyperspectral image in the set of hyperspectral images to derive a spectrum compact representation for each hyperspectral image in the set of hyperspectral images; a joint spatial-frequency (JSF) network module comprising a second plurality of programming instructions stored in the memory and operable on the processor, wherein the second plurality of programming instructions, when operating on the processor, cause the computing device to: obtain the spectrum compact representation for each hyperspectral image in the set of hyperspectral images; apply the spectrum compact representation for each hyperspectral image in the set of hyperspectral images as an input source of a joint spatial-frequency (JSF) network; and derive a reconstructed version of each hyperspectral image in the set of hyperspectral images, as an output of the joint spatial-frequency (JSF) network, based on the set of hyperspectral images applied as an input source of the joint spatial-frequency (JSF) network.

According to another preferred embodiment, there is provided a method for processing hyperspectral image information, comprising: obtaining a set of hyperspectral images; and deriving a spectrum compact representation for each hyperspectral image in the set of hyperspectral images; and encoding the spectrum compact representation for each hyperspectral image in the set of hyperspectral images with a video encoder to generate an encoded spectrum compact representation for each hyperspectral image in the set of hyperspectral images.

According to an aspect of an embodiment, the JSF network module comprises programming instructions stored in the memory and operable on the processor to create a neural network comprising a plurality of fusion blocks, and a plurality of sub-blocks.

According to an aspect of an embodiment, the JSF network module further comprises programming instructions stored in the memory and operable on the processor to create an attention module in the neural network.

According to an aspect of an embodiment, the video encoding module comprises an H.266 encoding module.

According to an aspect of an embodiment, the spectrum sub-sampling module further comprises programming instructions stored in the memory and operable on the processor to implement a convolutional autoencoder.

According to an aspect of an embodiment, the spectrum sub-sampling module further comprises programming instructions stored in the memory and operable on the processor to implement the convolutional autoencoder with four layers.

According to an aspect of an embodiment, there is provided a first input source for each fusion block of the plurality of fusion blocks, and a second input source for each fusion block of the plurality of fusion blocks.

According to an aspect of an embodiments, the video decoding module comprises an H.266 decoding module.

According to an aspect of an embodiment, the first input source comprises a pixel input source, and the second input source comprises a discrete cosine transform (DCT) input source.

According to an aspect of an embodiment, the JSF network module comprises programming instructions stored in the memory and operable on the processor to perform a block wise pixel shuffle on the spectrum compact representation.

According to an aspect of an embodiment, the encoded spectrum compact representation is transmitted as a bitstream over a wireless communication channel.

According to an aspect of an embodiment, a set of hyperspectral images is obtained that has a wavelength parameter ranging from 430 nanometers to 670 nanometers.

BRIEF DESCRIPTION OF THE DRAWING FIGURES

FIG. 1 is a block diagram illustrating components for processing hyperspectral image information, according to an embodiment.

FIG. 8 is a flow diagram illustrating another exemplary method for processing hyperspectral image information, according to an embodiment.

Figure 2:
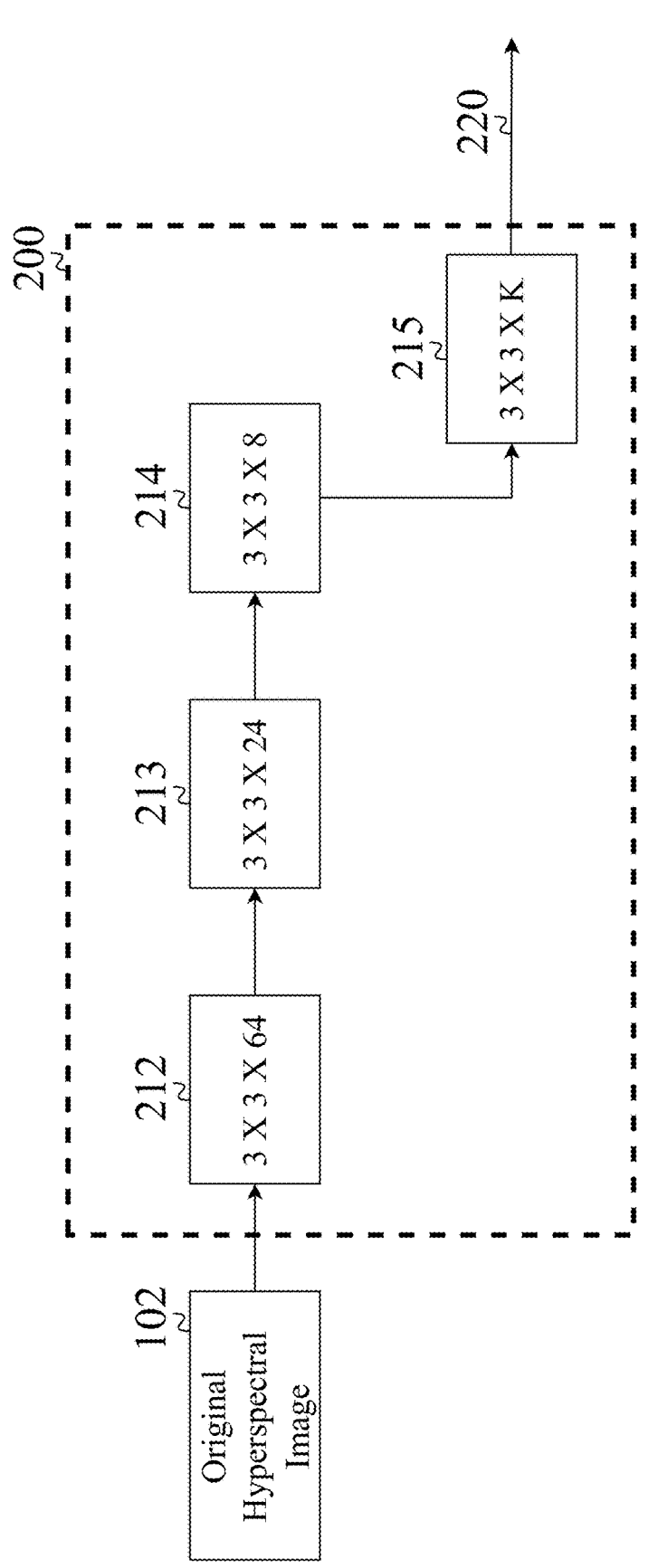
FIG. 2 is a block diagram illustrating details of a spectral compaction network, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

Generating and transmitting large amounts of hyperspectral image data can present several challenges and problems. Hyperspectral images contain a large amount of data, requiring more bandwidth and storage capacity. This can lead to increased costs and infrastructure requirements for data transmission and storage. Transmitting large amounts of image data over networks can be slow, especially in cases where the network bandwidth is limited. This can result in delays in data transfer and processing. Moreover, transmitting large amounts of hyperspectral image data over long distances can introduce latency, which can affect real-time applications or interactive systems.

Disclosed embodiments address the aforementioned issues with a novel approach that includes generating an encoded spectrum compact representation for each hyperspectral image in the set of hyperspectral images. A video codec, such as an H.266 encoding/decoding scheme can be used to operate on the spectrum compact representation to enable efficient compression and decompression of hyperspectral image data to provide for effective transmission of hyperspectral image information.

H.266/Versatile Video Coding (VVC) is a video compression standard developed by the Joint Video Experts Team (JVET), a collaboration between the ITU-T Video Coding Experts Group (VCEG) and the ISO/IEC Moving Picture Experts Group (MPEG). Disclosed embodiments can utilize H.266/VVC to achieve improved compression efficiency by employing various coding tools and techniques, including more sophisticated prediction methods, improved motion compensation, and better use of spatial and temporal redundancies. Thus, disclosed embodiments can provide improvements that result in reduced bitrate requirements for transmission of hyperspectral image information. In one or more embodiments, the H.266 encoder and decoder can be implemented in hardware, software, or a combination of hardware and software.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "pixel" refers to the smallest controllable element of a digital image. It is a single point in a raster image, which is a grid of individual pixels that together form an image. Each pixel has its own color and brightness value, and when combined with other pixels, they create the visual representation of an image on a display device such as a computer monitor or a smartphone screen.

The term "neural network" refers to a computer system modeled after the network of neurons found in a human brain. The neural network is composed of interconnected nodes, called artificial neurons or units, that work together to process complex information.

The term 'hyperspectral image' refers to an image in which each pixel of the image includes multiple (generally more than three) spectral bands from across the electromagnetic (EM) spectrum.

Conceptual Architecture

FIG. 1 is a block diagram 100 illustrating components for processing hyperspectral image information, according to an embodiment. The original hyperspectral image 102 can be obtained from an acquisition device such as a spectrometer, hyperspectral camera, and/or synthesized from RGB image data. The hyperspectral image 102 can include multiple narrow and contiguous spectral bands, capturing information across a wide range of wavelengths. In embodiments, obtaining a set of hyperspectral images comprises obtaining hyperspectral images having a wavelength parameter ranging from 430 nanometers to 670 nanometers. The high dimensionality of hyperspectral images allows for detailed analysis of the spectral characteristics of the scene, making hyperspectral images valuable for various aerial surveillance and information-gathering operations. The original hyperspectral image 102 is applied as an input to spectrum sub-sampling (SSS) network 104. The SSS network can include a convolutional autoencoder, that learns the spectrum compact representation, reducing the pixel dimension while having minimal information loss. The convolutional autoencoder provides a neural network architecture for unsupervised learning of efficient data representations. The autoencoder comprises an encoder and a decoder. The encoder compresses the input data into a lower-dimensional representation, while the decoder reconstructs the original input data from this representation. The convolutional autoencoder can utilize convolutional layers for both the encoder and decoder components. In one or more embodiments, convolutional layers in the encoder portion gradually reduce the spatial dimensions of the input data, followed by a bottleneck layer that represents the compressed representation. The output of the spectrum sub-sampling network 104 is input to a video encoder 106. In one or more embodiments, the video encoder 106 can include an H.266 video encoder. The video encoder 106 can generate a bitstream for communication over the wireless communication channel 110. The wireless communication channel 110 can include modulation schemes that include phase shift keying techniques, such as QPSK (Quadrature Phase Shift Keying), 8PSK (8-Phase Shift Keying), 16QAM (16-Quadrature Amplitude Modulation), OFDM (Orthogonal Frequency Division Multiplexing) along with other suitable higher-level protocols. Other modulation schemes may be used instead of, or in addition to, the aforementioned modulation schemes.

On the receiving end of the wireless communication channel 110, the data from the wireless communication channel is input to a video decoder 122. The video decoder 122 is capable of decoding the data that was encoded by video encoder 106. Thus, in disclosed embodiments, the video decoder may include an H.266 decoder. The output of the video decoder 122 is input to a joint spatial-frequency network (JSF) 124. The JSF 124 includes neural network elements configured to process hyperspectral image data in both a spatial domain and a spectral (frequency) domain. The JSF 124 provides dual branches to enable improved learning, resulting in a much larger receptive field at the beginning stages of the network, while allowing the two branches to learn from orthogonal representations of data. The output of the JSF 124 includes a reconstructed hyperspectral image 126 that is based on hyperspectral image data that is compressed prior to transmission via wireless communication channel 110. Embodiments can include transmitting the encoded spectrum compact representation as a bitstream over a wireless communication channel. Disclosed embodiments are also well-suited for storage and retrieval of hyperspectral images, in addition to communication of hyperspectral image data.

FIG. 2 is a block diagram illustrating details of a spectral compaction network, according to an embodiment. The original hyperspectral image 102 is input to a spectral compaction network (spectral sub-sampling (SSS) network) 200. The spectral sub-sampling network 200 can include a plurality of layers. As shown in FIG. 2, the spectral sub-sampling network 200 comprises four layers. A first layer 212 includes a layer that receives as input, data from original hyperspectral image 102, and outputs a 3×3×64 resolution version. A second layer 213 receives as input, data from layer 212, and outputs a 3×3×24 resolution version. A third layer 214 receives as input, data from layer 213, and outputs a 3×3×28 resolution version. A fourth layer 215 receives as input, data from layer 214, and outputs a 3×3×K resolution version. In embodiments, the value of K can be an integer value ranging from 2 to 4, enabling a compact representation of the form H×W×K. The compact representation can be input into an H.266 encoder (e.g., 106 of FIG. 1), with a secondary transform [VVC] retrained to better reflect the compact hyperspectral image information. In one or more embodiments, a unit of bpp (bits per pixel) may be used to quantify the efficacy of hyperspectral image compression. Disclosed embodiments can enable the generation of compressed hyperspectral information at a range of bitrates from 0.1 bpp to 4 bpp, and thus are well-suited for the use cases and communication constraints associated with aerial image acquisition from satellites, UAVs, aircraft, balloons, and/or other aerial devices. The output of layer 215 serves as output 220 of the spectral sub-sampling network 200. In embodiments, the spectrum sub-sampling module further comprises programming instructions stored in the memory and operable on the processor to implement a convolutional autoencoder. In embodiments, the convolutional autoencoder comprises four layers.

Figure 3:
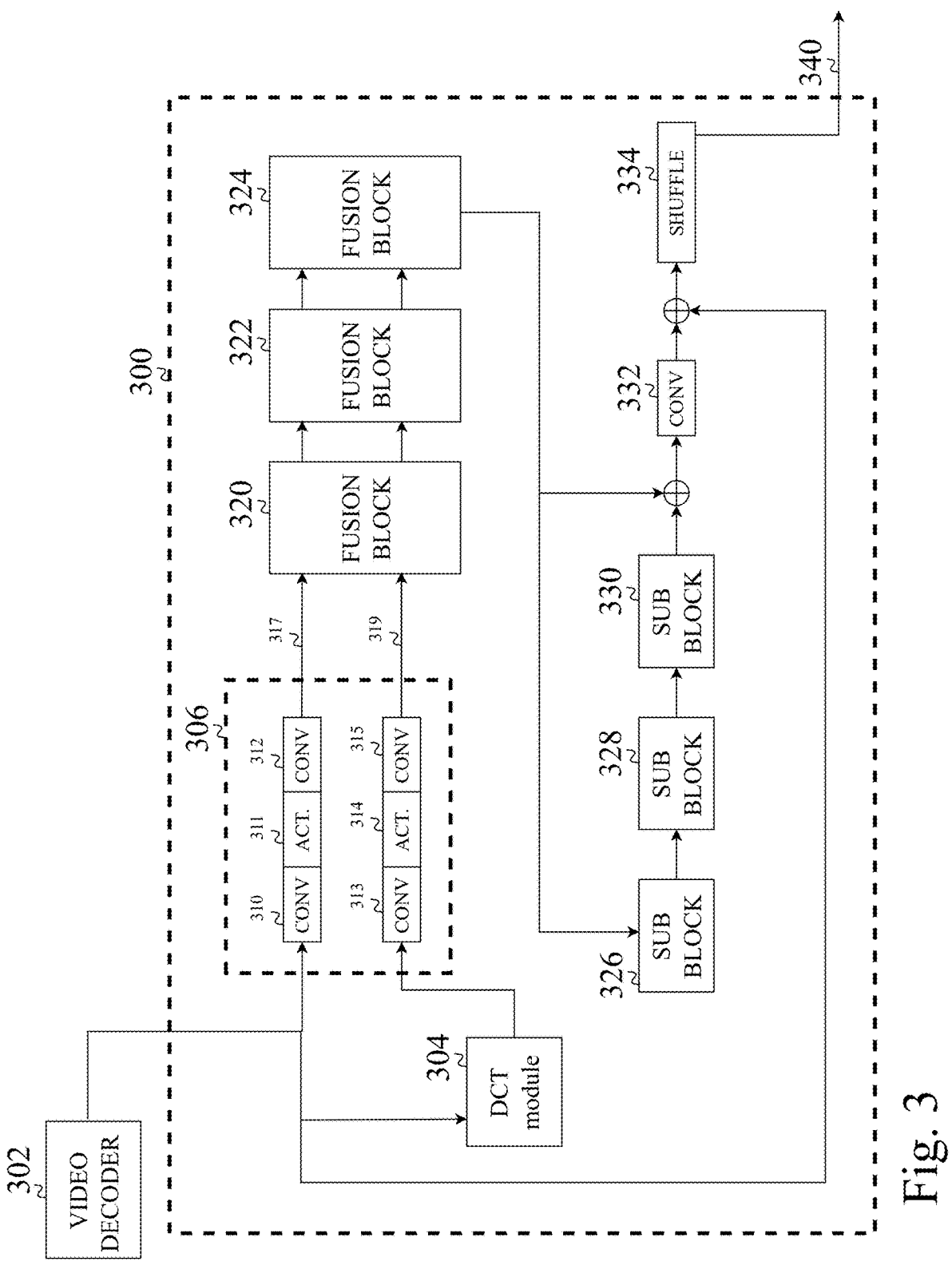
FIG. 3 is a diagram indicating details of a joint spatial-frequency (JSF) network, according to an embodiment.

FIG. 3 is a diagram indicating details of a joint spatial-frequency (JSF) network 300, according to an embodiment. JSF network 300 receives input from video decoder 302 (which may be similar to video decoder 122 of FIG. 1). The output of video decoder 302 is input to DCT module 304, which may perform a discrete cosine transform on the output of video decoder 302. Both spatial data and spectral data are input to preprocessing block 306. Preprocessing block 306 may include a decoding portion of a convolutional autoencoder, and/or other elements. Spatial data is input to convolutional layer 310, which may be followed by an activation block 311, followed by another convolutional layer 312. Similarly, spectral (frequency domain) data is input to convolutional layer 313, which may be followed by an activation block 314, followed by another convolutional layer 315. In one or more embodiments, one or more of the convolution layers may include transpose convolutional (T-conv) layers. In one or more embodiments, the activation block 311 and activation block 314 may implement a rectified linear unit (ReLU) activation function, and/or a ReLU variant such as a Leaky ReLU (LReLU) activation function, and/or a parametric ReLU (PRELU). In particular, one or more embodiments may utilize a PRELU activation function, which is represented mathematically as:

$$f(x_i) = \begin{cases} x_i, & x_i > 0 \\ \alpha_i x_i, & x_i \leq 0 \end{cases}$$

where $x_i$ represents the input from the $i^{th}$ layer input to the activation function. The various layers learn using the slope parameter denoted as $\alpha$, which can serve to boost model accuracy without adding signification computational overhead. In embodiments, the JSF network module further comprises programming instructions stored in the memory and operable on the processor to create a PRELU layer in the neural network. Embodiments can include applying an activation function on data derived from the output of the video decoder. In embodiments, applying the activation function on data derived from the output of the video decoder comprises applying a PRELU activation function.

Outputs of preprocessing block 306 include a spatial output 317, and a spectral output 319. The spatial output 317 can represent a pixel source. The spectral output 319 can represent a discrete cosine transform (DCT) input source. The spatial output 317 and spectral output 319 are input to fusion block 320. Outputs of fusion block 320 are input to fusion block 322, which in turn are provided to fusion block 324. While three fusion blocks are shown in FIG. 3, embodiments may have more or fewer fusion blocks. In embodiments, the fusion blocks (320, 322, and 324) enable multimodal learning that leverages complementary information from both the spectral domain and the spatial domain, leading to improved performance in hyperspectral image compression and decompression. In one or more embodiments, the spatial and frequency branches can have pre-embedding applied, and then be input through channel wise transformer fusion blocks. Disclosed embodiments serve to control the dimensions of Q, K, and V in the transformer to enable a deeper architecture while constraining network parameters to a manageable level. The values of Q, K, and V refer to the query, key, and value matrices, respectively, used in self-attention mechanisms that may be incorporated into one or more embodiments. The query matrix (Q) and key matrix (K) are used to calculate the similarity between a target position and all positions in the input sequence based on input embeddings by a learnable weight matrix. The value matrix (V) contains the embeddings of the input sequence and is used to compute the output of the attention mechanism. In one or more embodiments, an attention mechanism computes attention scores between the query and key vectors, which are then used to weight the corresponding value vectors. The weighted values can be summed to produce the output of the attention mechanism, which is then passed through feedforward and normalization layers in the transformer block to perform decompression of compressed hyperspectral information.

An output (e.g., a spatial output) of fusion block 324 is then input to sub-block 326, which provides input to sub-block 328, which provides input to sub-block 330. While three sub-blocks are shown in FIG. 3, embodiments may have more or fewer sub-blocks. The output of the sub-block 330 can be combined with fusion data from fusion block 324 and input to convolutional layer 332. The output of convolutional layer 332 can be combined with data from video decoder 302 and applied to shuffle layer 334. In embodiments, the shuffle layer 334 is used to introduce randomness or permutations into the sequence, which can help the model learn to be invariant to the order of elements in the sequence. This can serve to make disclosed embodiments more robust to variations in the arrangement of compressed hyperspectral information. The output of the shuffle layer 334 serves as output 340 of the JSF network 300, and represents the reconstructed hyperspectral image (e.g., 126 of FIG. 1). In embodiments, the JSF network module comprises programming instructions stored in the memory and operable on the processor to perform a block wise pixel shuffle on the spectrum compact representation.

Figure 4:
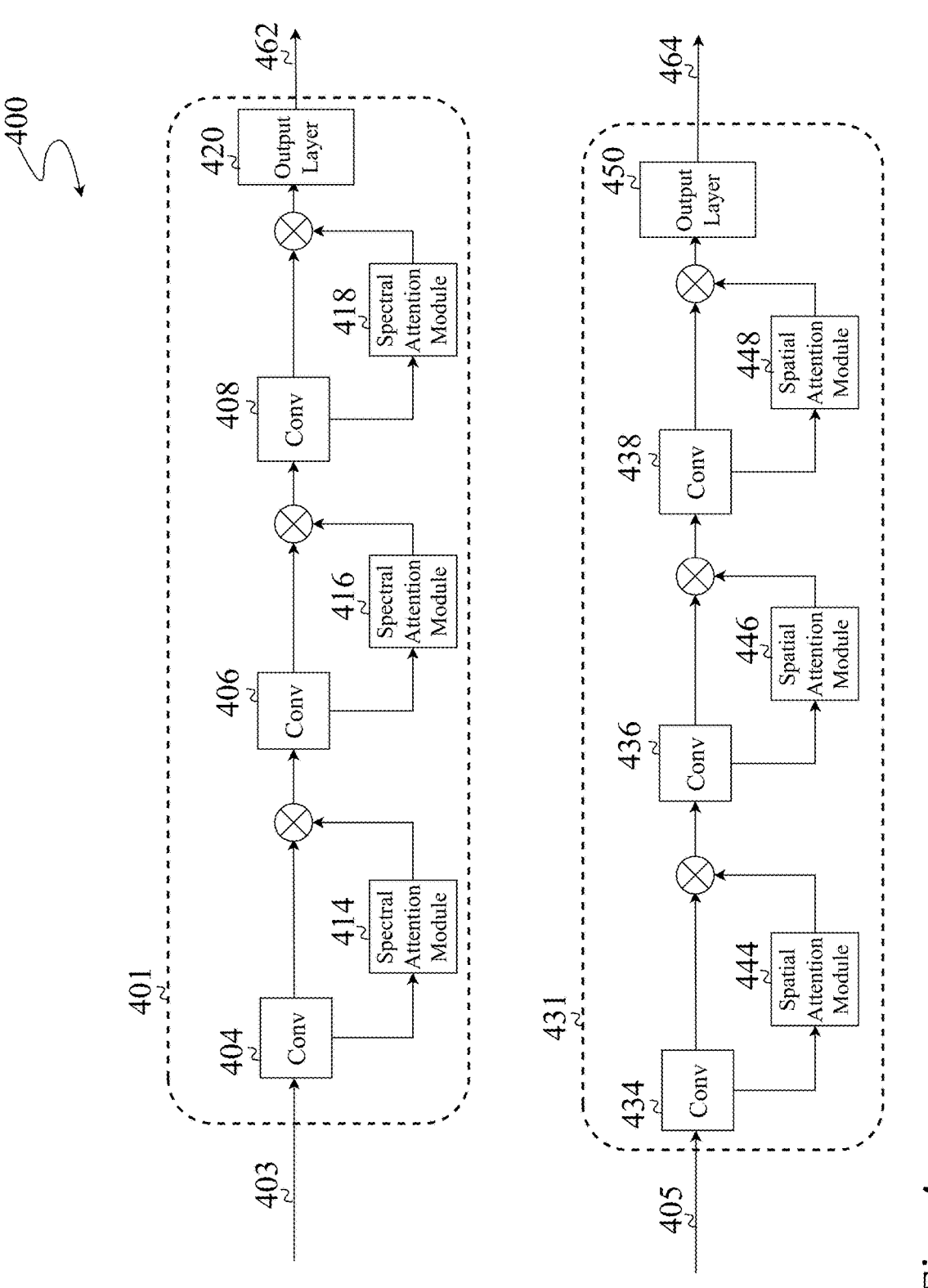
FIG. 4 is a diagram indicating details of a fusion block, according to an embodiment.

FIG. 4 is a diagram indicating details of a fusion block, according to an embodiment. Fusion block 400 receives a spatial (pixel source) input 403 and a spectral input 405. Thus, in embodiments, the first input source comprises a pixel input source, and the second input source comprises a discrete cosine transform (DCT) input source. In one or more embodiments, fusion block 400 can be implemented as a dual branch attention network that includes a first neural network 401, and a second neural network 431 configured as shown in FIG. 4. In the embodiment shown in FIG. 4, the first neural network 401 is for processing spectral information, and includes convolutional block 404, spectral attention module 414, convolutional block 406, spectral attention module 416, convolutional block 408, spectral attention module 418, and output layer 420, which may be interconnected as shown in FIG. 4. The second neural network 431 is for processing spatial information, and includes convolutional block 434, spatial attention module 444, convolutional block 436, spatial attention module 446, convolutional block 438, spatial attention module 448, and output layer 450, which may be interconnected as shown in FIG. 4. The output of the first neural network 401 is indicated at 462, and the output of the second neural network 431 is indicated at 464. The outputs 462 and 464 may be input to another fusion block, sub-block, or other neural network functional block to implement hyperspectral image decompression in accordance with disclosed embodiments. In embodiments, the JSF network can include one or more attention module. In embodiments, the attention module(s) can include a spatial multi-scale self-attention (S-MSA) block. In embodiments, the JSF network module further comprises programming instructions stored in the memory and operable on the processor to create a first input source for each fusion block of the plurality of fusion blocks, and a second input source for each fusion block of the plurality of fusion blocks.

Figure 5:
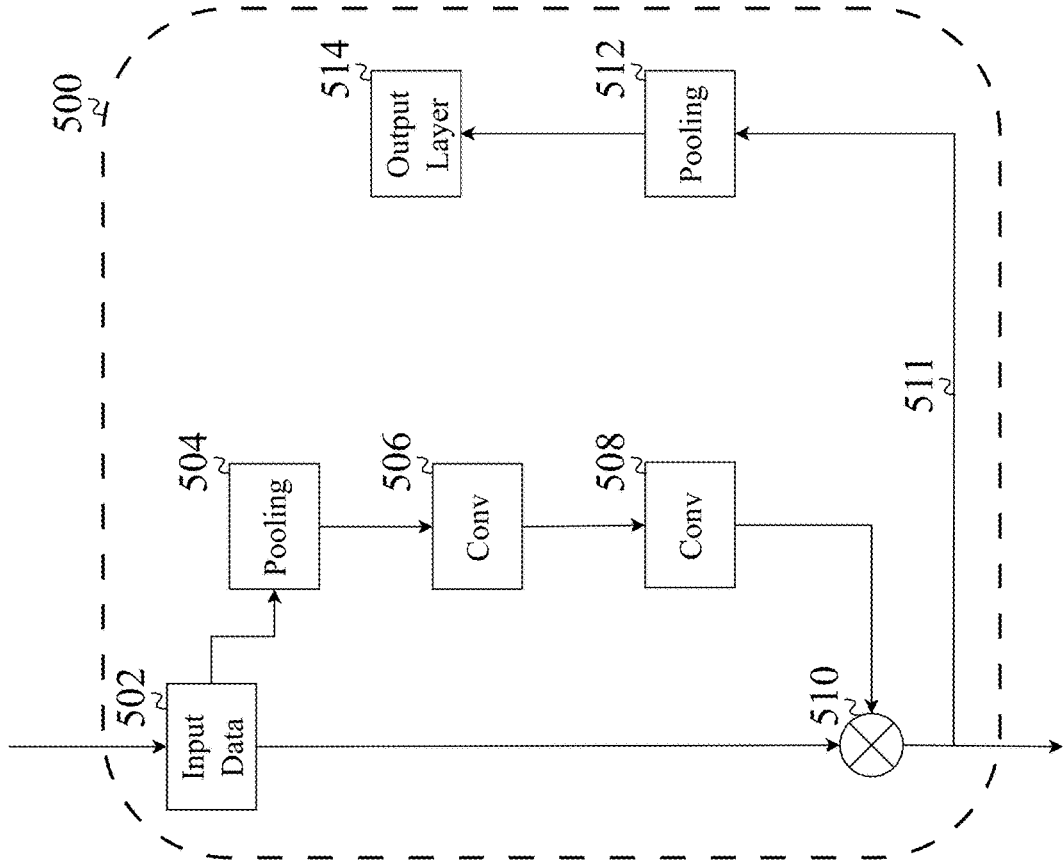
FIG. 5 is a diagram indicating details of a spectral attention module, according to an embodiment.

FIG. 5 is a diagram indicating details of a spectral attention module 500, according to an embodiment. Input data 502 can include hyperspectral image information of multiple channels. The input data 502 may be expressed as a feature map F of the form:

$$F^L \in G(C, H, W)$$

where C represents the channel number, H represents an input image height, and W represents an input image width, and where:

$$L \in \{1, 2, 3\}$$

The hyperspectral image information can be input to pooling layer 504, followed by convolutional block 506 and convolutional block 508. The pooling layer serves to reduce spatial dimension. The convolutional block 506 and convolutional block 508 can be implemented as 1-D convolutional layers to generate a spectral attention map. In one or more embodiments, a sigmoid function and/or ReLU function may be used as part of the convolutional block 506 and/or convolutional block 508. Elementwise multiplication can be performed by the element indicated at 510. The resulting output branch 511 connects to pooling layer 512. In one or more embodiments, pooling layer 512 can include a max-pooling layer. Pooling layer 512 can be followed by a fully connected output layer 514. The output branch 511 serves to provide supervised information for the spectral attention module, enabling a discriminative ability of a refined feature map. Moreover, the output branch 511 can serve to incorporate a regularization term to a loss function, which can help alleviate undesirable overfitting during the network training process.

Figure 6:
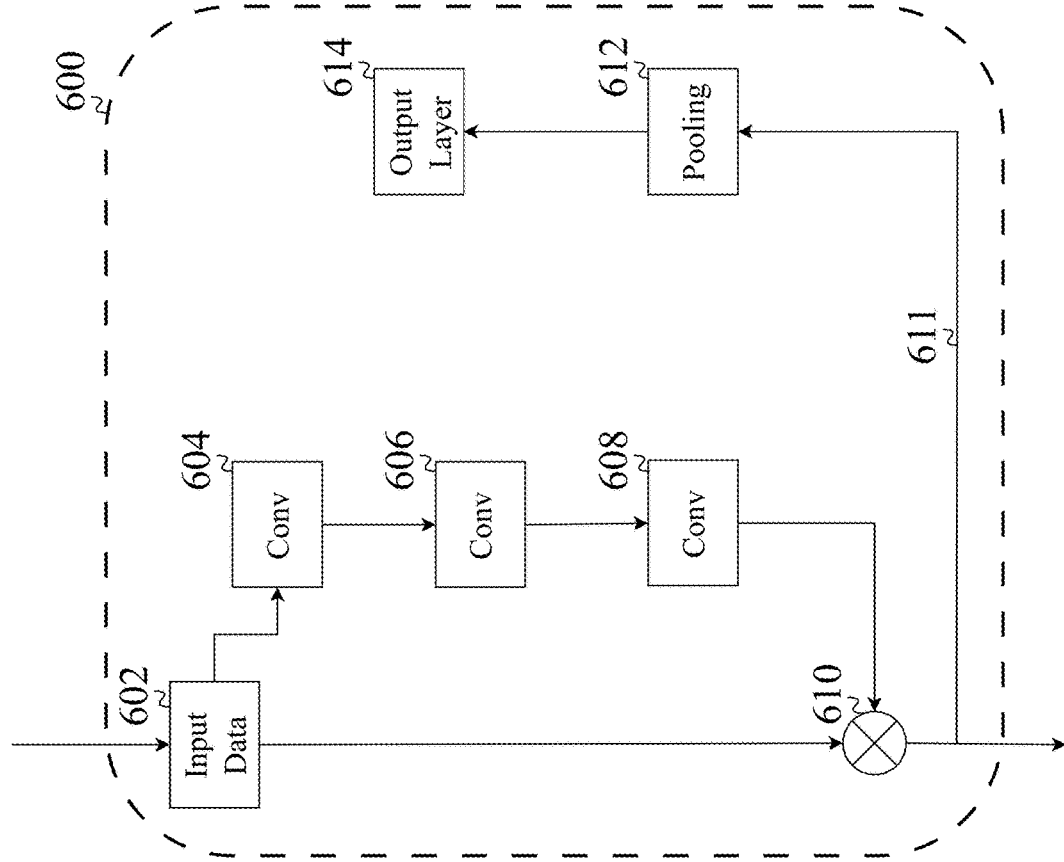
FIG. 6 is a diagram indicating details of a spatial attention module, according to an embodiment.

FIG. 6 is a diagram indicating details of a spatial attention module 600, according to an embodiment. Input data 602 can include hyperspectral image information of multiple channels. The input data 602 may be expressed as a feature map F of the form:

$$F^L \in G(C, H, W)$$

where C represents the channel number, H represents an input image height, and W represents an input image width, and where:

$$L \in \{1, 2, 3\}$$

Figure 7:
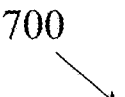
FIG. 7 is a flow diagram illustrating an exemplary method for processing hyperspectral image information, according to an embodiment.

The hyperspectral image information can be input to convolutional block 604, followed by convolutional block 606 and convolutional block 608. In one or more embodiments, convolutional block 604 can include a 1×1 convolutional layer to aggregate information along the channel direction of the feature map, resulting in a 2-D feature map. The convolutional block 606 and convolutional block 608 can include 2-D convolutional layers to generate a spatial attention map. In one or more embodiments, one or more of the convolutional blocks 604, 606, and 608 may also include padding operators. The padding operators can serve to avoid the change of spatial sizes. Elementwise multiplication can be performed by the element indicated at 610. The resulting output branch 611 connects to pooling layer 612. In one or more embodiments, pooling layer 612 can include an adaptive max-pooling layer. In one or more embodiments, the pooling layer 612 can be followed by output layer 614.
Detailed Description of Exemplary Aspects FIG. 7 is a flow diagram illustrating an exemplary method 700 for processing hyperspectral image information, according to an embodiment. According to the embodiment, the process begins at step 710 where an original hyperspectral image is obtained. The original hyperspectral image can be obtained from a hardware device such as a hyperspectral camera, and/or derived from an RGB image. In embodiments, multiple hyperspectral images (e.g., a set of hyperspectral images) may be obtained at step 710. The method 700 continues to step 720, where a spectrum compact representation is derived from the original hyperspectral image. In one or more embodiments, the spectrum compact representation is derived using a spectral sub-sampling (SSS) network, such as shown at 200 in FIG. 2. The method 700 continues to step 730, where the spectrum compact representation is encoded with a video encoder. In embodiments, the video encoder can include an H.266 video encoder. The method 700 can optionally continue to step 740, where the encoded spectrum compact representation is transmitted via a communication channel. The communication channel can be a wireless communication channel. In embodiments, the communication channel may utilize a modulation scheme such as QPSK (Quadrature Phase Shift Keying), 8PSK (8-Phase Shift Keying), 16QAM (16-Quadrature Amplitude Modulation), OFDM (Orthogonal Frequency Division Multiplexing) along with other suitable higher-level protocols.

Figure 9:
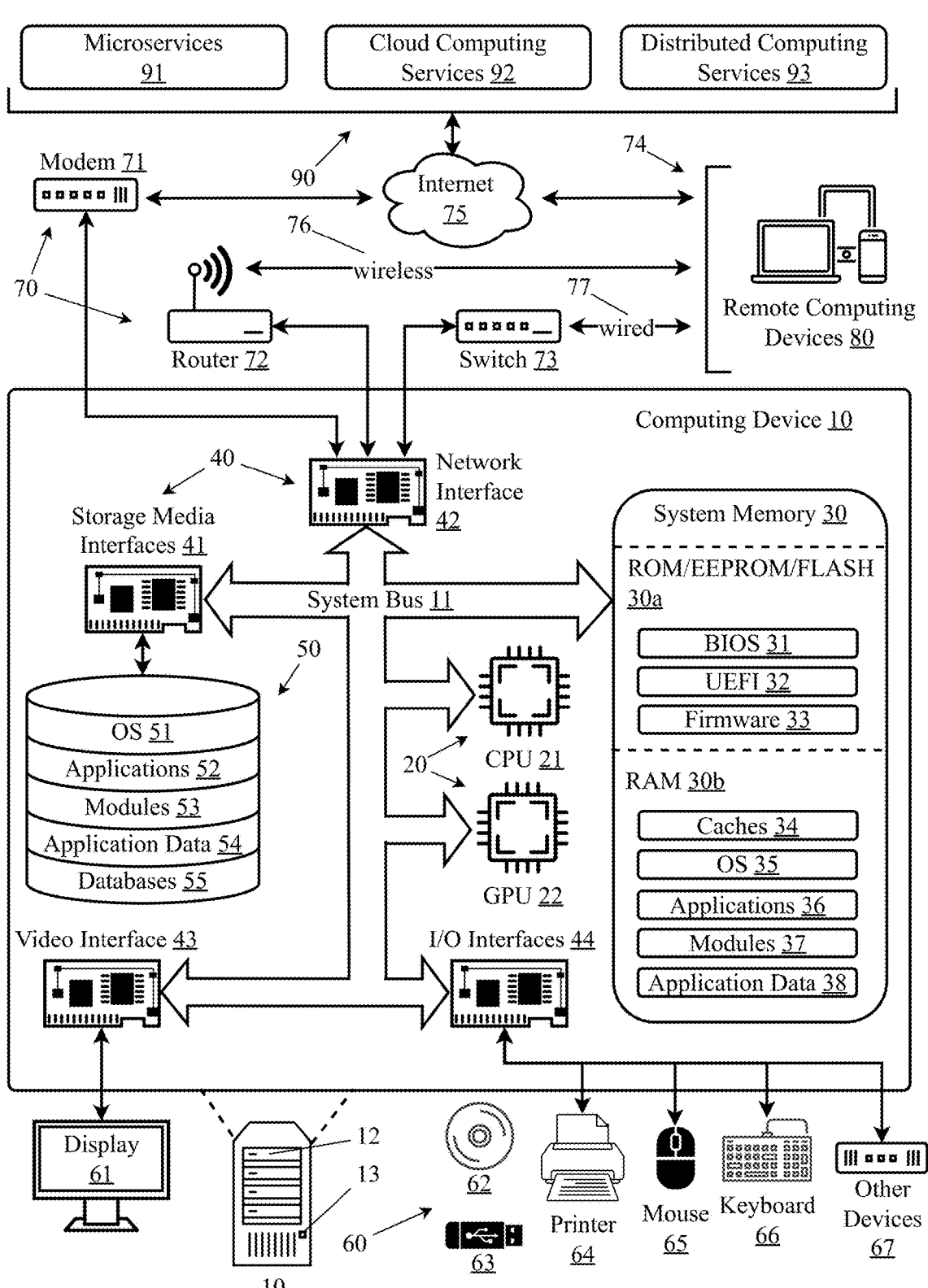
FIG. 9 illustrates an exemplary computing environment on which an embodiment described herein may be implemented, in full or in part.

FIG. 8 is a flow diagram illustrating an additional exemplary method 800 for processing hyperspectral image information, according to an embodiment. According to the embodiment, the process begins at step 810 where an encoded representation of a hyperspectral image (or set of hyperspectral images) is obtained. In an example use case, the encoded representation of hyperspectral images is obtained via a wireless communication channel. As a specific example, the hyperspectral images can be transmitted by an airborne transmitter (e.g., on an aircraft, UAV, etc.) and received by a land-based receiver. In another example use case, the encoded representation of hyperspectral images is obtained from a storage device, such as a hard disk. The method 800 continues to step 820, where the encoded representation is decoded with a video decoder to derive a spectrum compact representation. In one or more embodiments, the video decoder comprises an H.266 decoder. The method 800 continues to step 830, where the spectrum compact representation is applied to a joint spatial frequency (JSF) network, such as shown in FIG. 3. The method 800 continues to step 840, where the reconstructed hyperspectral image (or set of hyperspectral images) is obtained from the output of the JSF network.
Exemplary Computing Environment FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments provide improvements in the dissemination of hyperspectral images via wireless communication channels by enabling efficient compression and decompression techniques. Disclosed embodiments provide very high efficiency hyperspectral image compression for pixel and feature recovery for both machine vision and human-in-the-loop applications. Thus, disclosed embodiments can have a great impact on the surveillance and monitoring capabilities of aerial manned and unmanned craft that utilize hyperspectral image capturing devices.

The skilled person will be aware of a range of possible modifications of the various aspects described above. Accordingly, the present invention is defined by the claims and their equivalents.

What is claimed is:

1. A system for hyperspectral image encoding, comprising:

a computing device comprising at least a memory and a processor;

a spectral sub-sampling (SSS) module comprising a first plurality of programming instructions stored in the memory and operable on the processor, wherein the first plurality of programming instructions, when operating on the processor, cause the computing device to:

obtain a set of hyperspectral images; and derive a spectrum compact representation for each hyperspectral image in the set of hyperspectral images using a convolutional autoencoder comprising four layers, wherein the spectrum compact representation is in the form H×W×K;

a video encoding module comprising a second plurality of programming instructions stored in the memory and operable on the processor, wherein the second plurality of programming instructions, when operating on the processor, cause the computing device to:

obtain spectrum compact representation for each hyperspectral image in the set of hyperspectral images; and encode the spectrum compact representation for each hyperspectral image in the set of hyperspectral images using an H.266 encoder to generate an encoded spectrum compact representation for each hyperspectral image in the set of hyperspectral images compressed to a bitrate ranging from 0.1 bits per pixel to 4 bits per pixel, wherein the encoding utilizes both spectral and spatial characteristics of the hyperspectral images.

2. The system of claim 1, wherein the spectrum subsampling module further comprises programming instructions stored in the memory and operable on the processor to implement a convolutional autoencoder.

3. The system of claim 2, wherein the spectrum subsampling module further comprises programming instructions stored in the memory and operable on the processor to implement the convolutional autoencoder with four layers.

4. A method for processing hyperspectral image information, comprising:

obtaining a set of hyperspectral images; and deriving a spectrum compact representation for each hyperspectral image in the set of hyperspectral images using a convolutional autoencoder comprising four layers, wherein the spectrum compact representation is in the form H×W×K;

encoding the spectrum compact representation for each hyperspectral images using an H.266 video encoder to generate an encoded spectrum compact representation compressed to a bitrate ranging from 0.1 bits per pixel to 4 bits per pixel for each hyperspectral image in the set of hyperspectral images in the set of hyperspectral images, wherein the encoding utilizes both spectral and spatial characteristics of the hyperspectral images.

5. The method of claim 4, further comprising transmitting the encoded spectrum compact representation as a bitstream over a wireless communication channel.

6. The method of claim 5, further comprising:

obtaining the encoded representation for each hyperspectral image in a set of hyperspectral images from the wireless communication channel;

decoding the encoded representation for each hyperspectral image in the set of hyperspectral images with a video decoder to derive a spectrum compact representation for each hyperspectral image in the set of hyperspectral images;

applying the spectrum compact representation for each hyperspectral image in the set of hyperspectral images as an input source of a joint spatial-frequency (JSF) network, wherein the JSF network comprises a convolutional autoencoder; and deriving a reconstructed version of each hyperspectral image in the set of hyperspectral images that preserves both spatial structure and spectral band information, as an output of the joint spatial-frequency (JSF) network, based on the set of hyperspectral images applied as an input source of the joint spatial-frequency (JSF) network by:

processing spatial information through a first path comprising convolutional and activation layers;

processing spectral information through a second path parallel to the first path comprising convolutional and activation layers; and combining outputs from both paths using fusion blocks.

7. The method of claim 6, wherein the video decoder comprises an H.266 video decoder.

8. The method of claim 6, further comprising performing a block wise pixel shuffle on the spectrum compact representation, wherein the block wise pixel shuffle operation introduces randomness or permutations into the sequence of the spectrum compact representation to help the model learn to be invariant to the order of elements in the sequence.

9. The method of claim 6, further comprising applying an activation function on data derived from the output of the video decoder.

10. The method of claim 9, wherein applying the activation function on data derived from the output of the video decoder comprises applying a PRELU activation function.

11. The method of claim 4, wherein obtaining a set of hyperspectral images comprises obtaining hyperspectral images having a wavelength parameter ranging from 430 nanometers to 670 nanometers.

* * * * *